J. ROGERS.
APPARATUS FOR DETECTING LEAKS IN CONTAINERS.
APPLICATION FILED JULY 9, 1918.

1,296,699. Patented Mar. 11, 1919.
4 SHEETS—SHEET 1.

Inventor
James Rogers
By his Attorney

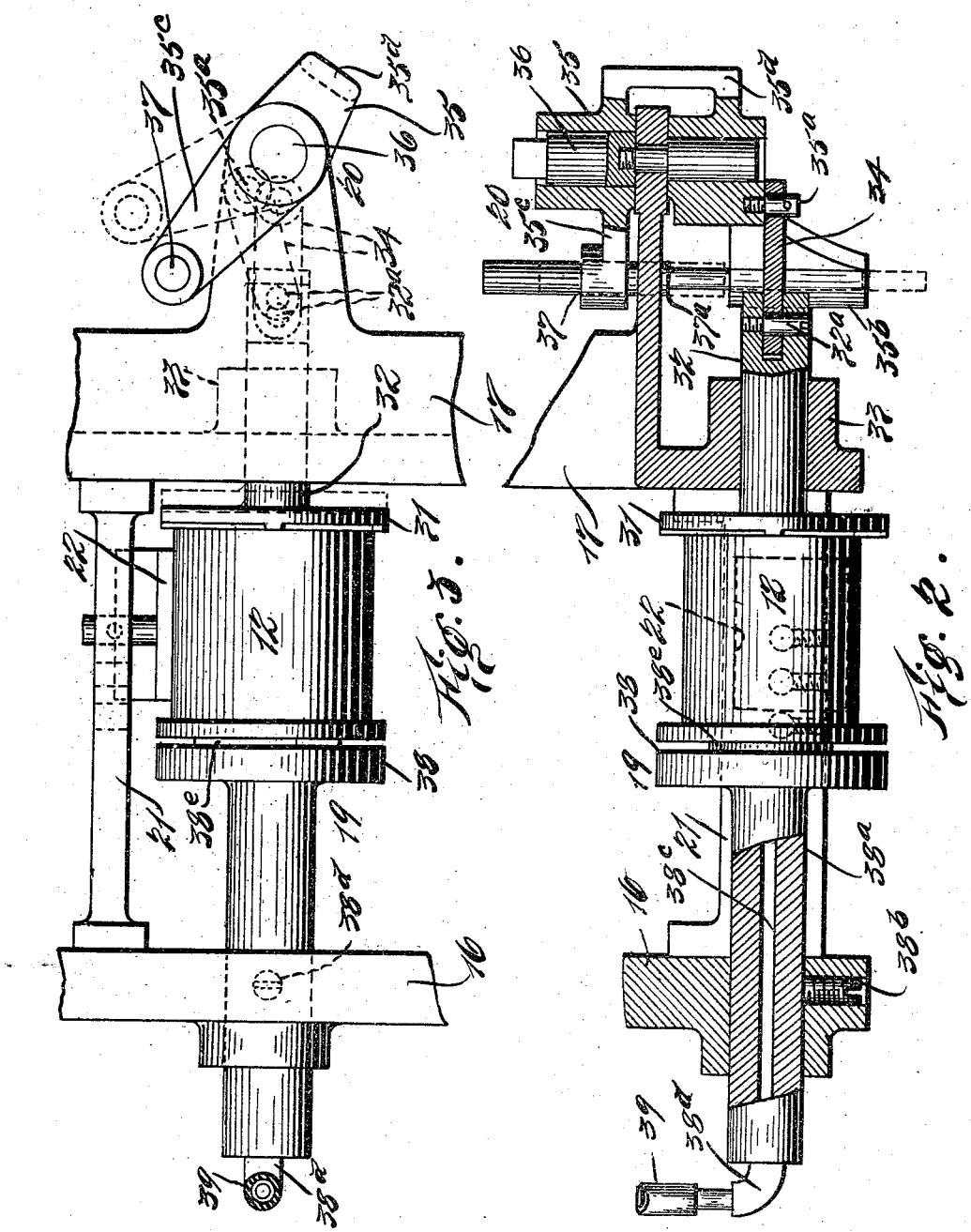

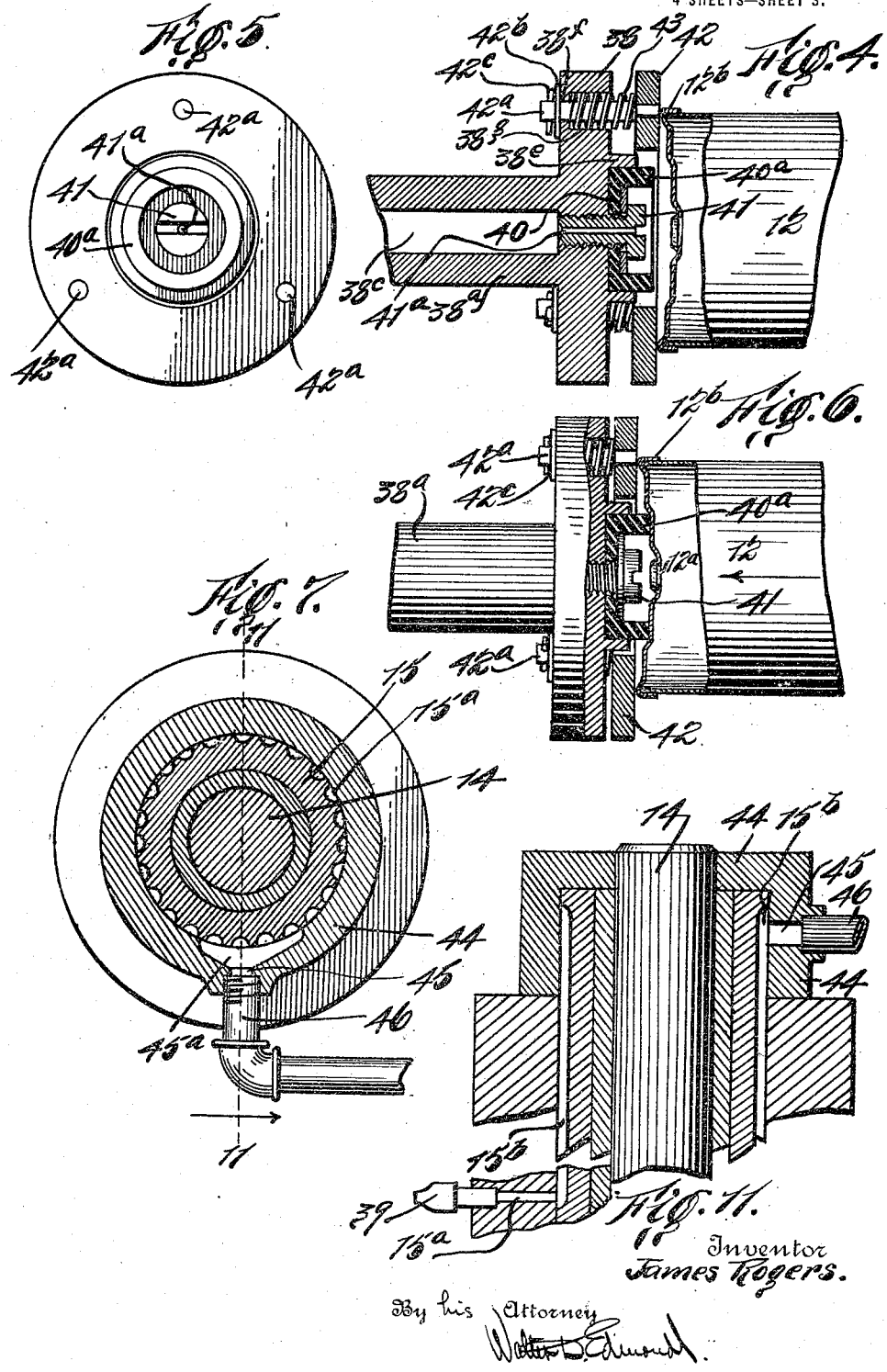

J. ROGERS.
APPARATUS FOR DETECTING LEAKS IN CONTAINERS.
APPLICATION FILED JULY 9, 1918.
1,296,699.
Patented Mar. 11, 1919.
4 SHEETS—SHEET 4.
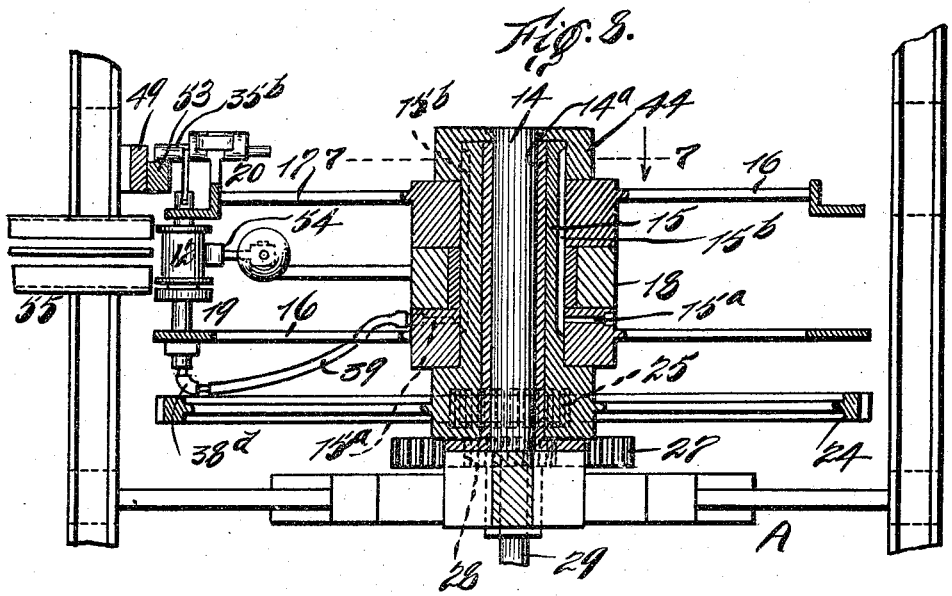
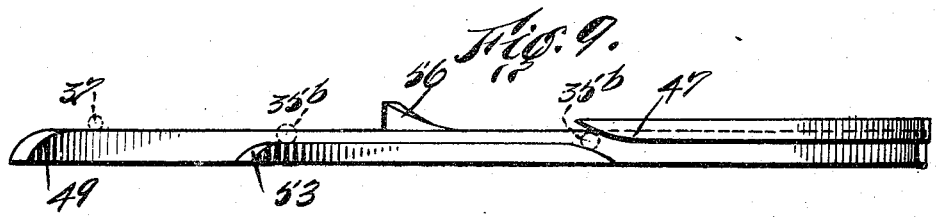
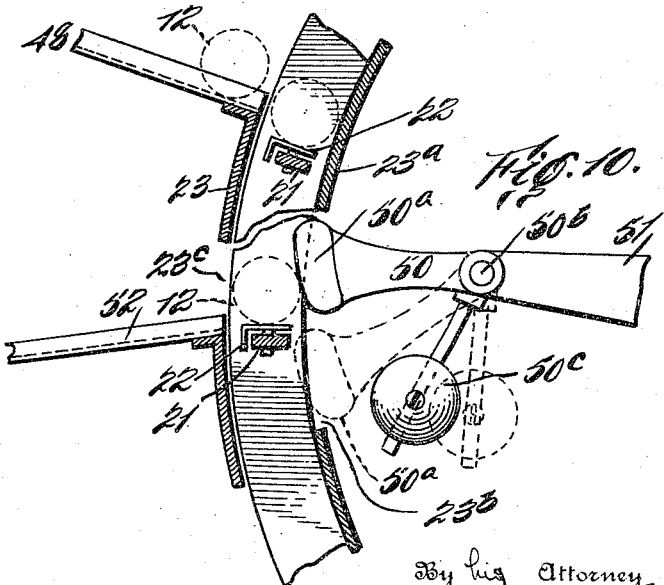
Inventor
James Rogers.
By his Attorney

UNITED STATES PATENT OFFICE.

JAMES ROGERS, OF DIXON, ILLINOIS, ASSIGNOR TO BORDEN'S CONDENSED MILK COMPANY, OF NEW YORK, N. Y., A CORPORATION OF NEW JERSEY.

APPARATUS FOR DETECTING LEAKS IN CONTAINERS.

1,296,699.  Specification of Letters Patent.  Patented Mar. 11, 1919.

Application filed July 9, 1918. Serial No. 244,130.

*To all whom it may concern:*

Be it known that I, JAMES ROGERS, a citizen of the United States, and a resident of Dixon, county of Lee, State of Illinois, have invented certain new and useful Improvements in Apparatus for Detecting Leaks in Containers, of which the following is a specification.

My invention relates to that well-known class of apparatus by aid of which leaks in cans, or other containers, are detectable by charging them with compressed air or other gas and submerging them, so charged, in water, or other transparent liquid, and the objects of my invention comprise provision of means whereby the container is more readily, accurately and effectively than heretofore positioned, and carried, in, and more quickly and certainly discharged from, the apparatus, and, also, and particularly, whereby issuance therefrom of compressed air through perforations capable of causing leaks, is more extendedly and effectively secured.

In the accompanying drawings, Figure 1 is an end view of the apparatus showing the principal elements, principally in elevation, a few of them being in vertical section, a few partly broken away and a few diagrammatically shown.

Fig. 2 is, on enlarged scale, a sectional view of certain parts taken on the line 2—2 of Fig. 1, and viewed in the direction of the arrow, except that the clamp-actuating pin is shown by full lines in normal position and by dotted lines in the position shown in Fig. 1.

Fig. 3 is a plan, or top, view of the parts shown in Fig. 2.

Fig. 4 is, on still larger scale, a diagrammatic sectional view showing details of construction of my improved pneumatic head in conjunction with a can about to be thereby temporarily closed.

Fig. 5 is an end view of the pneumatic head.

Fig. 6 is a partly sectional and partly diagrammatic view of parts shown in Fig. 4, but illustrating relative positions thereof while the can is temporarily closed and subjected to interior air pressure.

Fig. 7 is a detail view partly in plan, and partly in section on line 7—7 of Fig. 8 illustrating the construction whereby the supply of compressed air to the cans is effected.

Fig. 8 is a view, partly diagrammatic and partly in section on line 8—8 of Fig. 1 seen in the direction of the arrow and illustrating elements contributing to the carriage and sealing of the can, to the charging of it with compressed air, and to its discharge from the apparatus.

Fig. 9 is, on enlarged scale, a fragmentary detail view illustrating, in perspective, the system of cams segregated and viewed on the dotted line 9—9 of Fig. 1 from the direction of the arrow.

Fig. 10 is a fragmentary diagrammatic detail view, partly in section, illustrating one of my can ejectors, its operation and its relation to the carrier, to the can, and to a delivery chute.

Fig. 11 is a sectional view, on line 11—11 of Fig. 7, viewed in the direction of the arrow.

Figure 1:
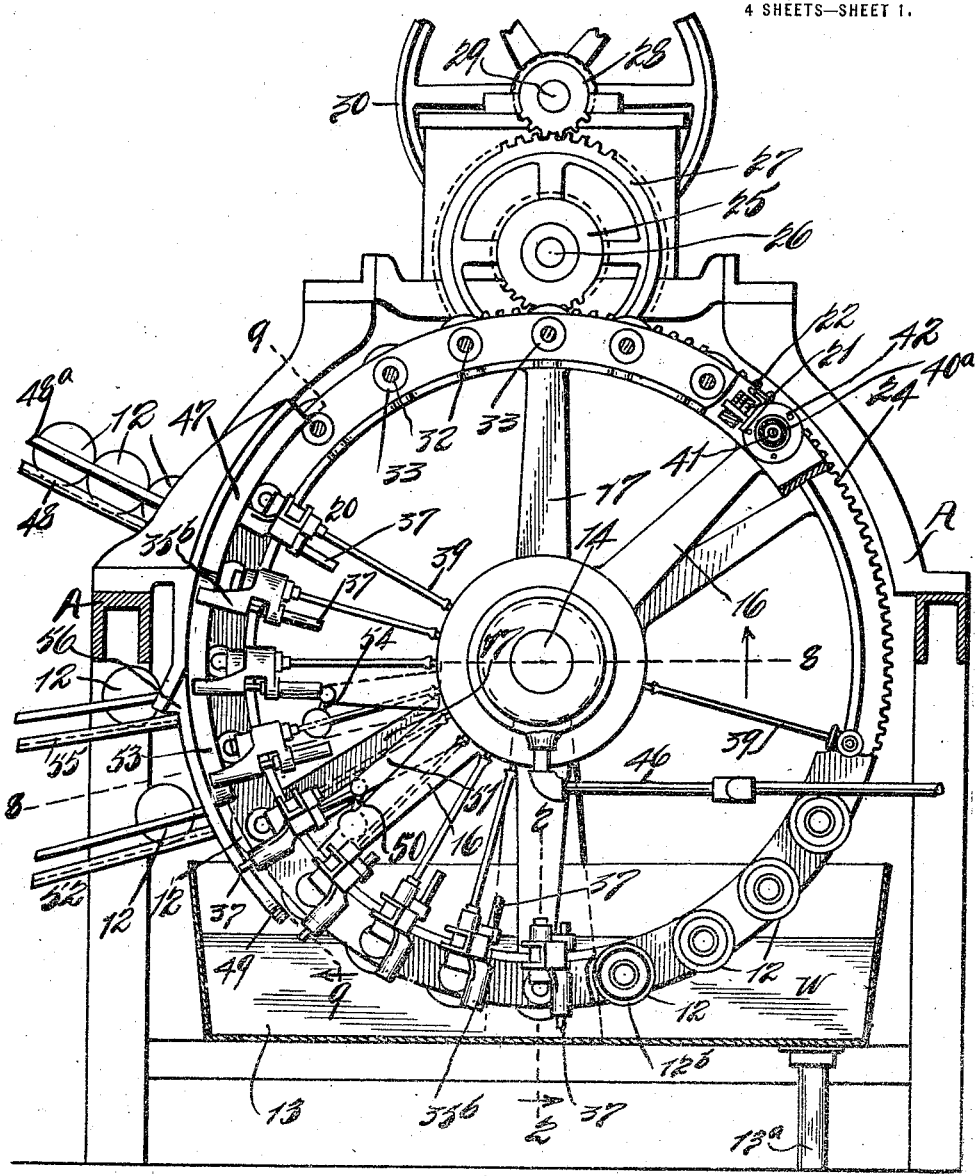

The apparatus comprises some instrumentalities of well-known function and character for thereinto feeding the container, in this instance cylindrical cans, 12, of usual type, having, in one end, or top, thereof the usual relatively small, therewith concentric, circular, opening, $12^a$, for charge and discharge therethrough of the contents of the can, and a therefrom longitudinally somewhat projecting, annular, peripheral, circumferential, edge, or flange, $12^b$, (Figs. 4 and 6, etc.). The apparatus further comprises the usual stationarily supported tank, 13, (Fig. 1), containing water, W, or other transparent liquid, and provided with a suitable discharge, $13^a$. It also comprises instrumentalities for therein locating and clamping the thereinto delivered cans, for charging them with compressed air or gas, and for carrying them, so charged, in sequence through the water in said tank, and thence to suitable respective chutes into one of which cans, from which air is observed to issue while in the water, are discharged, and, into the other, cans failing to thus indicate presence therein of leaks.

Above the tank is stationarily supported, in a suitable frame, A, a shaft, or spindle, 14, having a bushing, $14^a$, (Fig. 8) upon which is sleeved, or rotatorily mounted, a carrier comprising a hub, 15, carrying a plurality of mutually parallel pairs of therefrom equidistantly radially projecting alike rigid spokes, or arms. 16 indicates each spoke of one of said pairs and 17 the other (Fig. 8).

The hub is also journaled within a suitable stationary bearing, 18.

Each spoke, 16, carries proximate its free end, a pneumatic head, 19, (Fig. 8), disposed to bear, when required, against the top of a can circumferentially of its therein opening. This head embodies novel features hereinafter described. Each opposite spoke, 17, carries, proximate its free end, a clamping head, 20, (Fig. 8), disposed and actuated to, when required, clamp and hold a can between itself and the pneumatic head. Features of this clamping head will be hereafter more fully described. The spokes of each pair are, adjacent their free ends, connected by a transverse brace, 21, (Figs. 2 and 3), which serves also as a bracket, carrying a plate, 22, upon which falls a can when fed into the apparatus and by which it is, between the heads, and by aid of lateral stationary guide plates, 23, and 23ª, carried by a stationary part of the frame, approximately positioned and loosely, though efficiently, carried through those parts of its trajectory in which it is not more positively held clamped between the heads. The parts thus referred to coact to produce, as it were, a pocket for the can in the periphery of the carrier wheel, which thus carries a plurality of such alike pockets equally spaced apart.

The hub, 15, also carries a peripherally geared wheel, 24, meshing with a gear, 25, carried by a shaft, 26, journaled in bearings carried by a stationary part of the frame. The shaft, 26, also carries a peripherally geared wheel, 27, meshing with a gear, 28, carried by a shaft, 29, likewise journaled in bearings carried by a stationary part of the frame. The shaft 29 carries a pulley, 30, by aid of which the rotation is, as usual, imparted to the carrier.

The clamping heads, 20, each comprise (see Figs. 2 and 3) a circular head-piece, 31, disposed to bear against the bottom of a can. The head piece is carried by one end of a rod, or block, 32, slidably mounted in a spoke 17, and a thereby carried bracket, 33. The rod, or block, carries a pivot, 32ª, on which is oscillatably mounted one end of a link, 34, the opposite end of which is similarly mounted on a pivot, 35ª, carried by a clamp-head, 35, oscillatably mounted on a stud, 36, carried by a projecting part of the bracket. The clamp-head comprises a therefrom downward extension, or hub, 35ᵇ, (Fig. 2), and a thereabove disposed arm 35ᶜ. In this hub and arm is slidably mounted and frictionally held a pin, 37, having a shoulder, 37ª. The clamp-head, 35, also carries a handle 35ᵈ, by which the operator can clamp, or unclamp, by hand, if required. It follows from the construction described that when the clamp-head is swung, whether by resistance applied to the hub, or to the pin, or by force applied to the handle, the head-piece will be correspondingly withdrawn from, or forced against the bottom of, a can then positioned between it and the pneumatic head.

The pneumatic heads, 19, each comprises a head-piece proper, 38, disposed in alinement with the top of a can and carrying an arm, or spindle, 38ª, slidably mounted in and carried by one of the spokes, 16, but normally held in fixed relation to said spoke as by the set-screw, 38ᵇ, (Fig. 2). The arm, or spindle, 38ª, contains a duct, 38ᶜ, connected by a suitable union, 38ᵈ, with a conductor, 39 composed, in this instance, of flexible tubing and to which reference will hereafter be again made.

The operative face of the head-piece, 38, has integral therewith and projecting therefrom, a circular, therewith concentric, flange, 38ᵉ, (Fig. 4), thus forming therein a circular recess, or seat. Within this seat is fitted a disk, 40, (Fig. 4), of compressible resilient material such as rubber, having a therefrom projecting, therewith integral, annular flange, forming a gasket, 40ª. The disk, 40, is held in place within the recess by means of a screw, 41, threaded in the head-piece, 38, and having therethrough an axial boring, or duct, 41ª, whereby passage is afforded for compressed air from within the duct, 38ᶜ. It will be noted by reference to Fig. 6 that, as is of importance, the operative edge of the gasket, 40ª, is, when the can is positioned and clamped against it, located at a relatively considerable distance from the projecting peripheral edge, or corner, of the can, and correspondingly near to the opening thereof.

I provide a supplemental reciprocatable guiding, protective, and ejectory, head, 42, (Fig. 4), normally interposed in the path of the can while it is being clamped toward the pneumatic head.

This supplemental head, 42, I construct preferably in the form of an annular disk, as shown, disposed concentrically with the gasket, 40ª, and composed of relatively-non-compressible material such as metal. It is provided with thereby carried rods, 42ª, in this instance three, which are mounted slidably respectively in perforations, 38ᶠ, in the head piece, 38, and are each encircled by a spiral, expansile, spring, 43, lodged in a recess, 38ᵍ, chambered in said head-piece, and bearing at one end against it and at the other against the supplemental head to constantly, yieldingly, impel the latter toward its said normal position in the path of the can, which movement of the supplemental head is limited by washers, 42ᵇ, and pins, 42ᶜ, removably carried by the rods.

The flexible conductors, 39, respectively lead to, and are connected with, respective radially extending ducts, 15ª, therefor bored in the hub, 15, (Figs. 7, 8, 11), and connecting respectively with axially extending semi-circular concavities, 15ᵇ, countersunk in the exterior of a contracted part of the hub which is encircled by a stationary bushing, 44, through which passes radially a duct, 45, coupled and connecting with a conductor-pipe, 46, extending to a source of compressed air, not shown. Thus, as the carrier is rotated and the ducts, 15ᵃ, 15ᵇ, are thereby brought momentarily into register with the duct, 45, or with a therewith communicating recess, 45ᵃ, (Fig. 7), chambered in the bushing, 44, compressed air will pass therefrom into the pneumatic heads and so on into the cans which are then clamped against them.

A cam, 47, (Fig. 9), carried stationarily by a part of the frame of the apparatus, projects a convexly curved operative surface into the path of the hub, 35ᵇ, of the clamp-head, 35, then open, whereby the latter is turned to close the clamp and thus force the top of the can air-tightly against the gasket, 40ᵃ, of the pneumatic head.

A usual inclined chute, 48, comprising usual lateral guide-rails, 48ᵃ, (Fig. 1) is charged with the cans, the tops of which are positioned to face the spectator viewing Fig. 1. Down this chute the cans roll by aid of gravity and each drops, in turn, upon one of the then thereto, by rotation of the carrier, presented plates, 22, and between the then unclamped-together heads. As the rotation continues, the can advances between the lateral guide-plates, 23, 23ᵃ, and by aid of the combined influence of all these devices it becomes sufficiently positioned and centered.

As the rotation proceeds the cam, 47, is encountered by the hub, 35ᵇ, and the can is thereby clamped between the heads as above described. Further rotation of the carrier brings the ducts, 15ᵃ, and 15ᵇ temporarily into communication with the duct, 45, while the can is submerged in the water, W. At this stage any leak in the can will be indicated by air bubbles rising therefrom through the water. On observing these, the operator strikes the head of the pin, 37, thus driving it outwardly into abnormal projection beyond the hub, 35ᵇ, indicated by dotted lines in Fig. 2.

The continued rotation of the carrier brings the pin, 37, into contact with the convexly curved operative surface of a releasing cam, 49, (Figs. 1 and 9), stationarily carried by a part of the frame. By this cam, dispositioned to so contact an abnormally but not a normally projecting pin, the clamp-head, 35, is swung, thus opening the clamp, whereupon the spring tensioned supplemental head, 42, is freed to push the can from the gasket, 40, thus liberating the compressed air, if any, remaining in the can, and restoring the latter to its original relatively loosely held status between the plate, 22, the pneumatic and clamping heads and the lateral guide plates. Thence the rotation of the carrier next brings the can into contact with the convexly curved operative surface, 50ᵃ, of the free end of an oscillatable counter-weighted lever, or kicker, 50, (Fig. 10), which normally, as indicated by dotted lines in Fig. 10, projects slightly into the path of the can through a suitable opening, 23ᵇ, therefor, in the lateral guide plates, 23ᵃ. The kicker, 50, is oscillatably mounted on a pivot, 50ᵇ, carried by an arm, 51, carried by the stationary bearing, 18, (Fig. 8). A counter-weight, 50ᶜ, is carried by the kicker. An opening, 23ᶜ, in the guide plate, 23, permeable by the can, leads to a delivery chute, 52, for the, at this stage, as aforesaid, unclamped, imperfect cans. As a can in its progression bears against the operative surface of the kicker it crowds and raises the latter until the can arrives opposite the opening 23ᶜ, at which point the resistance afforded by the guide plate, 23, having ceased, the influence of the counter-weight is exerted and the imperfect can is automatically, and with required force, shot out of the apparatus, through the opening, and onto the chute, 52, whence it proceeds to wherever may be desired.

As to the perfect cans, these are, while still clamped, carried past the opening, 23ᶜ, after which the hub, 35ᵇ, of the then closed clamp-head encounters another cam, 53, (Fig. 9) similar, in counter, function, and relative disposition, to the cam 49, whereby the clamp-head, 35, is swung to unclamp the can which is thereafter carried in the same manner as were the imperfect cans, to contact with another kicker, 54, (Fig. 1), similar to the kicker, 50, which similarly operates to eject the perfect cans from the apparatus into another chute, 55, similiar to the chute 52.

To restore the abnormally projected pins to their normal positions in their respective hubs, 35ᵇ, I provide a cam, 56, (Figs. 1 and 9), carried by a stationary part of the frame and having an inclined operative face disposed in the path of the projecting end of said pins. Thence continued rotation of the carrier again brings the heads and their accessories opposite to the charging chute, 48, from which another can is taken, and the above described cycle of operations is thereon repeated and so on with other cans indefinitely.

In previous apparatuses for the purposes described, the compressible, or sealing, portions of the pneumatic heads have been so proportioned and located as to bear not only against an extended surface of the top of the can, but also against its projecting peripheral edge, 12ᵇ, thereby blanketing therein located perforations, or leak holes, if any, and to that extent interfering with the comprehensiveness and reliability of the pneumatic test of those portions so blanketed and which, particularly in proximity to the said edge, are more likely to be imperfect. An important novel feature of my invention consists in provision of means whereby it becomes possible to change the previous proportions and location of the said compressible portions of the pneumatic head to, as shown in the drawings, those of a mere comparatively narrow gasket, the contact of which with the top of the can is limited to a relatively narrow zone comparatively closely surrounding the opening and which is far from reaching to the projecting circumferential edge of the top.

My invention further comprises provision of the novel supplemental head, 42, reciprocatable in parallelism with the axes of the clamping head and of the can and normally disposed to project slightly in advance of the gasket into the path of the can as it is being pushed by the clamping head into sealing contact with the pneumatic head.

In previous constructions, the location of the compressible portions of the pneumatic head, so as to overlie, or blanket, the projecting peripheral edges, or corners, of the can, not only, as above stated, obstructed, or prevented, testing where often most required, but also resulted in undesirable wear, or deformation, of the compressible portion of the pneumatic head, whereby ease and accuracy of installation and of positioning of the can in the holder were undesirably, and progressively, impeded. These infirmities are obviated by my diminution of the proportions of the compressible portions and their location as a mere gasket in relatively close proximity to the opening of the can and far from the edge referred to, which not only serves to protect the compressible portions of the pneumatic head from the undesirable wear referred to, but also facilitates accurate and rapid automatic installation of the can in the holder, and its thereafter movement therein in required direction toward the gasket. But such changes in proportions and locations of the compressible portions would prove practically inoperative were it not for the assistance rendered by my supplemental head. This is due to the edge of the can encountering during installation, the relatively durable, smooth, incompressible and frictionless surface of the supplemental head, which latter also yields slightly, but resiliently, during its initial contact and the then occurring installation and adjustment of the can, comparably to the fingers of an operator were the installation manually effected. Moreover, after the installation and sufficient adjustment of the can has been, as above described, automatically effected, and during its movement toward the pneumatic head, the supplemental head assists in guiding the can in the proper direction, and in preventing the cans bringing up against the gasket under the positive impulse of the clamping head with such shock or jar as might prove disturbing, or injurious. The supplemental head also assists in breaking the sealing contact of the can with the gasket when the clamping head is retracted.

Having now described my invention, what I claim as new and desire to secure by Letters Patent is the following, viz:

1. In an apparatus for detecting leaks in containers, a container-holder comprising a pneumatic head, stationary relatively to the container, and having a compressible-resilient operative surface, or gasket, disposed and proportioned to continuously air-tightly join with the top of the container intermediate its periphery and its opening; a supplemental head reciprocatable in parallelism with the central longitudinal axes of the container and of said first mentioned head, and having its operative surface normally disposed to contact with the top of the container in advance of said sealing head; resilient means to yieldingly impel said supplemental head toward, and to restore it to, its said normal disposition; a clamping head reciprocatable in parallelism with said supplemental head, and disposed oppositely thereto; and means to force said clamping head toward said pneumatic head until an interposed container is clamped between the two heads and thereafter to return said clamping head to its original position.

2. In an apparatus for detecting leaks in containers, a container-holder comprising a relatively stationary pneumatic head having a compressible resilient operative edge, or gasket, disposed and proportioned to afford an air-tight seal surrounding the opening and between it and the peripheral edge of the containers; a reciprocatable clamping head coöperating with said pneumatic head; a therewith in parallelism reciprocatable and concentric spring-tensioned supplemental head having its operative edge normally disposed in the path of the container in said holder in advance, and outside, of the operative edge of said pneumatic head; and means to reciprocate said clamping head toward and from said pneumatic head.

3. In an apparatus for detecting leaks in cylindrical cans having in their tops a concentric opening; means disposed to receive the can and admit of its reciprocation longitudinally therein; the said means comprising a pneumatic head adjacent one end thereof, and having a compressible resilient continuous operative edge, or gasket, disposed to contact the top of the can intermediate its opening and its peripheral edge; adjacent the opposite end of said holder a head disposed to contact the bottom of the can; normally intermediate said heads an annular therewith concentric spring-tensioned supplemental head having its operative edge normally disposed in advance of said pneumatic head and means to cause said two first mentioned heads to clamp the can between them.

4. In an apparatus for detecting leaks in containers, means to clamp a container, comprising a head carrying an annular compressible gasket; a thereto oppositely disposed therewith concentric and coöperating axially reciprocatable clamping head; means to supply compressed air to within said gasket; and an annular therewith concentric axially reciprocatable supplemental head composed of comparatively non-compressible material disposed externally of said gasket and normally intermediate said heads in the path of the container while it is being impelled by said clamping-head toward said gasket.

5. In an apparatus for detecting leaks in containers, means to therein clamp a container, said means comprising a pneumatic head, a thereto oppositely disposed reciprocatable clamping-head coöperating therewith, and a yielding supplemental head reciprocatable in parallelism with said clamping head and having its operative surface normally disposed in a plane intermediate said two first named heads.

JAMES ROGERS.

Witnesses:
ALBERT BORST,
EMIL KING.

Copies of this patent may be obtained for five cents each, by addressing the "Commissioner of Patents, Washington, D. C."